(12) United States Patent
Tsuboi et al.

(10) Patent No.: US 9,780,933 B2
(45) Date of Patent: Oct. 3, 2017

(54) COMMUNICATION SYSTEM, BASE STATION APPARATUS, MOBILE STATION APPARATUS, MEASUREMENT METHOD, AND INTEGRATED CIRCUIT

(71) Applicant: SHARP KABUSHIKI KAISHA, Osaka-shi, Osaka (JP)

(72) Inventors: Hidekazu Tsuboi, Osaka (JP); Katsunari Uemura, Osaka (JP); Daiichiro Nakashima, Osaka (JP); Wataru Ouchi, Osaka (JP); Kimihiko Imamura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/401,067

(22) PCT Filed: May 15, 2013

(86) PCT No.: PCT/JP2013/063508
§ 371 (c)(1),
(2) Date: Nov. 13, 2014

(87) PCT Pub. No.: WO2013/176013
PCT Pub. Date: Nov. 28, 2013

(65) Prior Publication Data
US 2015/0124731 A1 May 7, 2015

(30) Foreign Application Priority Data
May 21, 2012 (JP) .................................. 2012-115159

(51) Int. Cl.
*H04L 5/00* (2006.01)
*H04W 24/10* (2009.01)

(52) U.S. Cl.
CPC ........... *H04L 5/0048* (2013.01); *H04W 24/10* (2013.01)

(58) Field of Classification Search
CPC ... H04W 28/04; H04W 72/04; H04W 72/042; H04L 5/0007
See application file for complete search history.

(56) References Cited

U.S. PATENT DOCUMENTS

| | | | | |
|---|---|---|---|---|
| 8,121,589 B2* | 2/2012 | Fischer | ................. | H04W 24/10 455/422.1 |
| 8,442,513 B2* | 5/2013 | Krishnamurthy | ...... | H04B 17/24 455/422.1 |

(Continued)

FOREIGN PATENT DOCUMENTS

| | | |
|---|---|---|
| JP | 2012-9945 A | 1/2012 |
| WO | WO 2013/061507 A1 | 4/2013 |

OTHER PUBLICATIONS

Ericsson et al: "Measurement framework based on CSI-RS", 3GPP Draft; R2-122529-Measurement Framework Based on CSI-RS, 3rd Generation Partnership Project (3GPP), vol. RAN WG2, No. Prague, Czech Republic; May 21, 2012-May 25, 2012, May 15, 2012.

(Continued)

*Primary Examiner* — Mark Rinehart
*Assistant Examiner* — Sanjay K Dewan
(74) *Attorney, Agent, or Firm* — Birch, Stewart, Kolasch & Birch, LLP

(57) ABSTRACT

In a communication system in which a base station apparatus notifies a mobile station apparatus of a measurement configuration indicating a configuration of measurement using a reference signal, in the measurement configuration, there are at least a first measurement configuration to carry out measurement using a cell-specific reference signal and a second measurement configuration to carry out measure- (Continued)

ment using a channel state information reference symbol, and the mobile station apparatus determines whether the measurement configuration is the first measurement configuration or the second measurement configuration based on the measurement configuration notified from the base station apparatus.

2 Claims, 5 Drawing Sheets

(56) References Cited

U.S. PATENT DOCUMENTS

| | | | | |
|---|---|---|---|---|
| 8,472,539 B2* | 6/2013 | Ko | ............... | H04L 5/0023 375/260 |
| 8,543,128 B2* | 9/2013 | Jen | ............... | H04B 7/2606 455/422.1 |
| 8,599,960 B2* | 12/2013 | Koivisto | ............... | H04B 7/024 375/260 |
| 8,724,590 B2* | 5/2014 | Bi | ............... | H04W 36/0055 370/331 |
| 8,750,887 B2* | 6/2014 | Chandrasekhar | ..... | H04L 5/0096 370/252 |
| 8,787,216 B2* | 7/2014 | Yoon | ............... | H04L 5/0007 370/203 |
| 8,798,550 B2* | 8/2014 | Hammarwall | ....... | H04B 7/0456 370/252 |
| 8,934,326 B2* | 1/2015 | Bhattad | ............... | H04J 11/005 370/201 |
| 9,094,855 B2* | 7/2015 | Etemad | ............... | H04W 24/10 |
| 9,198,071 B2* | 11/2015 | Geirhofer | ............... | H04L 1/0026 |
| 9,246,558 B2* | 1/2016 | Ng | ............... | H04B 7/024 |
| 9,264,192 B2* | 2/2016 | Park | ............... | H04L 5/0035 |
| 9,326,178 B2* | 4/2016 | Jung | ............... | H04W 24/08 |
| 9,332,560 B2* | 5/2016 | Park | ............... | H04W 52/242 |
| 9,398,481 B2* | 7/2016 | Chai | ............... | H04W 24/00 |
| 9,398,559 B2* | 7/2016 | Davydov | ............... | H04W 4/06 |
| 9,408,121 B2* | 8/2016 | Xiao | ............... | H04W 36/0088 |
| 9,438,451 B2* | 9/2016 | Chen | ............... | H04L 25/03929 |
| 2012/0051451 A1* | 3/2012 | Kwon | ............... | H04L 5/0053 375/285 |

OTHER PUBLICATIONS

Intel Corporation: "CSI-RS Based RRM Measurement for DL CoMP", 3GPP Draft; R2-122832 CSI-RS Based RRM Measurement for DL CoMP, 3rd Generation Partnership Project (3GPP), vol. RAN WG2 no. Prague, Czech Republic; May 21, 2012-May 25, 2012, May 15, 2012.

New Postcom: "Considerations on CSI-RS based RRM measurement", 3GPP Draft; R2-122265 Considerations on CSI-RS Based RRM Measurements, 3rd Generation Partnership Project (3GPP), vol. RAN WG2, no. Prague, Czech Republic; May 21, 2012-May 25, 2012, May 15, 2012.

Alcatel-Lucent Shanghai Bell et al., "Measurement for CoMP," 3GPP TSG-RAN WG2 #77bis Meeting, R2-121699, Jeju, Korea, Mar. 26-30, 2012, pp. 1-4.

Fujitsu, "Discussion on CoMP Measurement set Management," 3GPP TSG-RAN WG2 #76bis Meeting, R2-121802, Jeju, Korea, Mar. 26-30, 2011, pp. 1-4.

3GPP TS 36. 331, Radio Resource Control (RRC); Protocol specification, Mar. 2012, V10.5.0.

3GPP TSG-RAN WG2#78 meeting, Fujitsu, Discussion on CoMP Measurement set Management, R2-122864, May 21, 2012.

3GPP TSG-RAN WG2#78, Motorola Mobility, CoMP Measurements, R2-122711, May 21, 2012.

* cited by examiner

COMMUNICATION SYSTEM, BASE STATION APPARATUS, MOBILE STATION APPARATUS, MEASUREMENT METHOD, AND INTEGRATED CIRCUIT

TECHNICAL FIELD

The present invention relates to a communication system, a base station apparatus, a mobile station apparatus, a measurement method, and an integrated circuit, and particularly relates to a communication system in which a mobile station apparatus measures a received signal based on configurations notified from a base station apparatus.

BACKGROUND ART

Progress in the radio access system and the radio network of cellular mobile communication (hereinafter, referred to as "long term evolution (LTE)" or "evolved universal terrestrial radio access (EUTRA)") is under review in the 3rd Generation Partnership Project (3GPP), and LTE-Advanced (also referred to as LTE-A or "Advanced EUTRA") to further develop LTE to apply a new technique is also under review.

In Advanced EUTRA, in order to reduce or suppress the interference to a mobile station apparatus or in order to increase the received signal power, intercell cooperative (cooperative multipoint; CoMP) communication to carry out communication by cooperation between adjacent cells with each other is under review. For example, as the intercell cooperative communication, reviews are made on a method of applying different weighting signal processes for a plurality of cells (precoding processes) to a signal and transmitting the signal to an identical mobile station apparatus by cooperation of a plurality of base station apparatuses (also referred to as joint processing; JP, joint transmission; JT), a method of scheduling to a mobile station apparatus by cooperation of a plurality of cells (coordinated scheduling; CS), a method of transmitting a signal to a mobile station apparatus by applying beamforming by cooperation of a plurality of cells (coordinated beamforming; CB), a method of transmitting a signal using a predetermined resource only in one cell and not transmitting a signal by a resource overlapping the resource in another cell (blanking, muting), and the like.

The plurality of cells used for intercell cooperative communication may be cells managed by a different base station apparatus for each cell and may also be cells managed by the same base station apparatus. Each cell may also be configured with a radio unit (also referred to as remote radio head; RRH, remote radio unit; RRU) controlled by the control unit of the base station main body. The radio unit may also be connected to the base station apparatus main body with a wire, such as an optical fiber, and may also be connected wirelessly, as in a relay station device.

CITATION LIST

Non-Patent Document

NPL 1: R2-122864, Discussion on CoMP Measurement set Management (http://www.3gpp.org/ftp/tsg_ran/WG2_RL2/TSGR2_78/Docs/R2-122864.zip)
NPL 2: R2-122711, CoMP Measurements (http://www.3gpp.org/ftp/tsg_ran/WG2_RL2/TSGR2_77bis/Docs/R2-122711.zip)
NPL 3: 3GPP TS36.331, Radio Resource Control (RRC); Protocol specification. V10.5.0 (http://www.3gpp.org/ftp/Specs/html-info/36331.htm)

DISCLOSURE OF THE INVENTION

Problems to be Solved by the Invention

In 3GPP, to carry out measurement of received quality using a channel state information reference symbol (CSI-RS) in order to optimize cell carrying out intercell cooperative communication is under review in the discussions of Advanced EUTRA.

In NPL 1, it is proposed to newly define a mechanism that a base station apparatus notifies a mobile station apparatus of resource information of the channel state information reference symbol (CSI reference signal) as an object of measurement and the mobile station apparatus reports received quality of the channel state information reference symbol to the base station apparatus, and in NPL 2, it is proposed to extend the mechanism of conventional radio resource management (RRM) measurement to received quality measurement using a channel state information reference symbol. In NPL 2, it is proposed to carry out, to the RRM measurement mechanism, extension indicating measurement of a channel state information reference symbol in the definition of measurement quantities, extension of making a condition for report to be a condition applicable to measurement of a channel state information reference symbol, and extension of including information of a channel state information reference symbol in the measurement configuration.

However, in NPL 2, although a parameter to be altered from the mechanism of conventional radio resource management (RRM) measurement is proposed for measurement using a channel state information reference symbol, specific identification (switching) between the conventional RRM measurement and the new measurement using the channel state information reference symbol needs new definition of the measurement quantities and an efficient method of measurement report using the mechanism of conventional RRM measurement is not proposed.

The present invention has been made in view of the problems above, and it is an object thereof to provide a communication system, a base station apparatus, a mobile station apparatus, a measurement method, and an integrated circuit that are capable of efficiently carrying out measurement using a channel state information reference symbol.

Means for Solving the Problems (1) In order to achieve the above object, the present invention has taken measures as follows. That is, a communication system of the present application includes a base station apparatus to notify a mobile station apparatus of a measurement configuration indicating a configuration of measurement using a reference signal, wherein the measurement configuration includes a measurement object indicating at least a frequency to be an object of measurement, the base station apparatus notifies, in a case of configuring a first measurement configuration to carry out measurement using a cell-specific reference signal, the mobile station apparatus of the measurement configuration that does not include a configuration of a channel state information reference symbol in the measurement object and notifies, in a case of configuring a second measurement configuration to carry out measurement using the channel state information reference symbol, the mobile station apparatus of the measurement configuration including one or more configurations of a channel state information reference symbol in the measurement object, and the mobile station apparatus determines, in a case that the configuration of the channel state information reference symbol is not included in the measurement object, the measurement configuration as the first measurement configuration and determines, in a case that the configuration of the channel state information reference symbol is included in the measurement object of the measurement configuration, the measurement configuration as the second measurement configuration.

(2) A communication system of the present application includes a base station apparatus to notify a mobile station apparatus of a measurement configuration indicating a configuration of measurement using a reference signal, wherein the measurement configuration includes a report configuration indicating a condition to report a measurement result, and further, the report configuration includes an identification bit indicating a first state or a second state, the base station apparatus notifies, in a case of configuring a first measurement configuration to carry out measurement using a cell-specific reference signal, the mobile station apparatus of the measurement configuration with the identification bit as the first state and notifies, in a case of configuring a second measurement configuration to carry out measurement using a channel state information reference symbol, the mobile station apparatus of the measurement configuration with the identification bit as the second state, and the mobile station apparatus determines, based on the identification bit notified from the base station apparatus, in a case that the identification bit is in the first state, the measurement configuration as the first measurement configuration and determines, in a case that the identification bit is in the second state, the measurement configuration as the second measurement configuration.

(3) In the communication system of the present application, the measurement configuration includes the report configuration in common with the first measurement configuration and the second measurement configuration, and the mobile station apparatus configures, in a case that the measurement configuration is the second measurement configuration, a channel state information reference symbol used in intercell cooperative communication of a serving cell at a frequency specified by the measurement object as a reference signal of a serving cell indicated in the report configuration and configures a channel state information reference symbol indicated in the measurement object as a reference signal of an adjacent cell indicated in the report configuration.

(4) A communication system of the present application includes a base station apparatus to notify a mobile station apparatus of a measurement configuration indicating a configuration of measurement using a reference signal, wherein the measurement configuration includes a report configuration indicating a condition to report a measurement result, and further, the report configuration includes measurement event information indicating a measurement event specified as a condition of the report, the base station apparatus selects, in a case of configuring a first measurement configuration to carry out measurement using a cell-specific reference signal, a measurement event having the cell-specific reference signal as a reference signal as the measurement event to notify the mobile station apparatus and selects, in a case of configuring a second measurement configuration to carry out measurement using a channel state information reference symbol, a measurement event having a channel state information reference symbol as a reference signal as a measurement event of the report configuration to notify the mobile station apparatus of the measurement configuration, and the mobile station apparatus determines, based on the measurement event information notified from the base station apparatus, in a case that the measurement event is the measurement event having the cell-specific reference signal as the reference signal, the measurement configuration as the first measurement configuration and determines, in a case that the measurement event is the measurement event having the channel state information reference symbol as the reference signal, the measurement configuration as the second measurement configuration.

(5) A communication system of the present application includes a base station apparatus to notify a mobile station apparatus of a measurement configuration indicating a configuration of measurement using a reference signal, wherein the mobile station apparatus configures, in a case that a second measurement configuration to carry out measurement using a channel state information reference symbol is notified, an identifier to identify one or more channel state information reference symbol configurations included in the second measurement configuration as a configuration of a physical cell identifier of an adjacent cell included in the measurement report to the base station apparatus and transmits the measurement report to the base station apparatus, and the base station apparatus determines, when the measurement configuration notified to the mobile station apparatus is a first measurement configuration to carry out measurement using a cell-specific reference signal, the configuration of the physical cell identifier included in the measurement report as the physical cell identifier of the adjacent cell and determines, when the measurement configuration notified to the mobile station apparatus is the second measurement configuration, the configuration of the physical cell identifier included in the measurement report is the identifier to identify the one or more channel state information reference symbol configurations included in the second measurement configuration.

(6) A base station apparatus of the present application notifies a mobile station apparatus of a measurement configuration indicating a configuration of measurement using a reference signal, wherein the measurement configuration includes a measurement object indicating at least a frequency to be an object of measurement, the base station apparatus notifies, in a case of carrying out a first measurement configuration to carry out measurement using a cell-specific reference signal, the mobile station apparatus of the measurement configuration that does not include a configuration of a channel state information reference symbol in the measurement object and notifies, in a case of carrying out a second measurement configuration to carry out measurement using the channel state information reference symbol, the mobile station apparatus of the measurement configuration including one or more configurations of a channel state information reference symbol in the measurement object.

(7) A base station apparatus of the present application notifies a mobile station apparatus of a measurement configuration indicating a configuration of measurement using a reference signal, wherein the measurement configuration includes a report configuration indicating a condition to report a measurement result, and further, the report configuration includes an identification bit indicating a first state and a second state, and the base station apparatus notifies, in a case of carrying out a first measurement configuration to carry out measurement using a cell-specific reference signal, the mobile station apparatus of the measurement configuration with the identification bit of the report configuration as the first state and notifies, in a case of carrying out a second measurement configuration to carry out measurement using the channel state information reference symbol, the mobile station apparatus of the measurement configuration with the identification bit of the report configuration as the second state.

(8) A base station apparatus of the present application notifies a mobile station apparatus of a measurement configuration indicating a configuration of measurement using a reference signal and to receive a measurement report from the mobile station apparatus, wherein the base station apparatus determines, when the measurement configuration notified to the mobile station apparatus is a first measurement configuration to carry out measurement using a cell-specific reference signal, the configuration of the physical cell identifier included in the measurement report as the physical cell identifier of the adjacent cell and determines, when the measurement configuration notified to the mobile station apparatus is a second measurement configuration, the configuration of the physical cell identifier included in the measurement report is the identifier to identify the one or more channel state information reference symbol configurations included in the second measurement configuration.

(9) A mobile station apparatus of the present application receives a measurement configuration indicating a configuration of measurement using a reference signal from a base station apparatus, wherein the measurement configuration includes a measurement object indicating at least a frequency to be an object of measurement, and the mobile station apparatus determines, in a case that the configuration of a channel state information reference symbol is not included in the measurement object of the measurement configuration notified from the base station apparatus, the measurement configuration as a first measurement configuration to carry out measurement using a cell-specific reference signal and determines, in a case that the configuration of the channel state information reference symbol is included in the measurement object of the measurement configuration, the measurement configuration as a second measurement configuration to carry out measurement using a channel state information reference symbol.

(10) A mobile station apparatus of the present application receives a measurement configuration indicating a configuration of measurement using a reference signal from a base station apparatus, wherein the measurement configuration includes a report configuration indicating a condition to report a measurement result, and further, the report configuration includes an identification bit indicating a first state and a second state, and the mobile station apparatus determines, based on the identification bit included in the report configuration of the measurement configuration notified from the base station apparatus, in a case that the identification bit is in the first state, the measurement configuration as a first measurement configuration to carry out measurement using a cell-specific reference signal and determines, in a case that the identification bit is in the second state, the measurement configuration as a second measurement configuration to carry out measurement using a channel state information reference symbol.

(11) A mobile station apparatus of the present application receives a measurement configuration indicating a configuration of measurement using a reference signal from a base station apparatus, wherein the mobile station apparatus configures, in a case that a measurement configuration to carry out measurement using a channel state information reference symbol is notified as the measurement configuration from the base station apparatus, an identifier to identify one or more channel state information reference symbol configurations included in the measurement configuration as a configuration of a physical cell identifier of an adjacent cell included in the measurement report to the base station apparatus and transmits the measurement report to the base station apparatus.

(12) A measurement method of the present application is used for a mobile station apparatus that receives a measurement configuration indicating a configuration of measurement using a reference signal from a base station apparatus, wherein the measurement configuration includes a measurement object indicating at least a frequency to be an object of measurement, and the method includes the steps of: determining the measurement configuration as a first measurement configuration to carry out measurement using a cell-specific reference signal in a case that a configuration of a channel state information reference symbol is not included in the measurement object of the measurement configuration notified from the base station apparatus; and determining the measurement configuration as a second measurement configuration to carry out measurement using a channel state information reference symbol in a case that a configuration of the channel state information reference symbol is included in the measurement object of the measurement configuration.

(13) A measurement method of the present application is used for a mobile station apparatus that receives a measurement configuration indicating a configuration of measurement using a reference signal from a base station apparatus, wherein the measurement configuration includes a report configuration indicating a condition to report a measurement result, and further, the report configuration includes an identification bit indicating a first state and a second state, and the method includes the steps of: based on the identification bit included in the report configuration of the measurement configuration notified from the base station apparatus, determining the measurement configuration as a first measurement configuration to carry out measurement using a cell-specific reference signal in a case that the identification bit is in the first state; and determining the measurement configuration as a second measurement configuration to carry out measurement using a channel state information reference symbol in a case that the identification bit is in the second state.

(14) A measurement method of the present application is used for a mobile station apparatus that receive a measurement configuration indicating a configuration of measurement using a reference signal from a base station apparatus, and the method includes the steps of: configuring an identifier to identify one or more channel state information reference symbol configurations included in the measurement configuration as a configuration of a physical cell identifier of an adjacent cell included in the measurement report to the base station apparatus in a case that a measurement configuration to carry out measurement using a channel state information reference symbol is notified as the measurement configuration from the base station apparatus; and transmitting the measurement report to the base station apparatus.

(15) An integrated circuit of the present application is mounted in a mobile station apparatus that receives a measurement configuration indicating a configuration of measurement using a reference signal from a base station apparatus, wherein the measurement configuration includes a measurement object indicating at least a frequency to be an object of measurement, and the integrated circuit includes a function of determining, in a case that the configuration of the channel state information reference symbol is not included in the measurement object of the measurement configuration notified from the base station apparatus, the measurement configuration as a first measurement configuration to carry out measurement using a cell-specific reference signal; and determining, in a case that the configuration of the channel state information reference symbol is included in the measurement object of the measurement configuration, the measurement configuration as a second measurement configuration to carry out measurement using a channel state information reference symbol.

(16) An integrated circuit of the present application is mounted in a mobile station apparatus that receives a measurement configuration indicating a configuration of measurement using a reference signal from a base station apparatus, wherein the measurement configuration includes a report configuration indicating a condition to report a measurement result, and further, the report configuration includes an identification bit indicating a first state and a second state, and the integrated circuit includes a function of determining, based on the identification bit included in the report configuration of the measurement configuration notified from the base station apparatus, in a case that the identification bit is in the first state, the measurement configuration as a first measurement configuration to carry out measurement using a cell-specific reference signal; and determining, in a case that the identification bit is in the second state, the measurement configuration as a second measurement configuration to carry out measurement using a channel state information reference symbol.

(17) An integrated circuit of the present application is mounted in a mobile station apparatus that receives a measurement configuration indicating a configuration of measurement using a reference signal from a base station apparatus, wherein the integrated circuit includes a function of configuring, in a case that a measurement configuration to carry out measurement using a channel state information reference symbol is notified as the measurement configuration from the base station apparatus, an identifier to identify one or more channel state information reference symbol configurations included in the measurement configuration as a configuration of a physical cell identifier of an adjacent cell included in the measurement report to the base station apparatus; and transmitting the measurement report to the base station apparatus.

Effects of the Invention

According to the present invention, it is possible to provide a communication system, a base station apparatus, a mobile station apparatus, a measurement method, and an integrated circuit that are capable of efficiently carrying out measurement using a channel state information reference symbol.

BEST MODE FOR CARRYING OUT THE INVENTION

Figure 1:
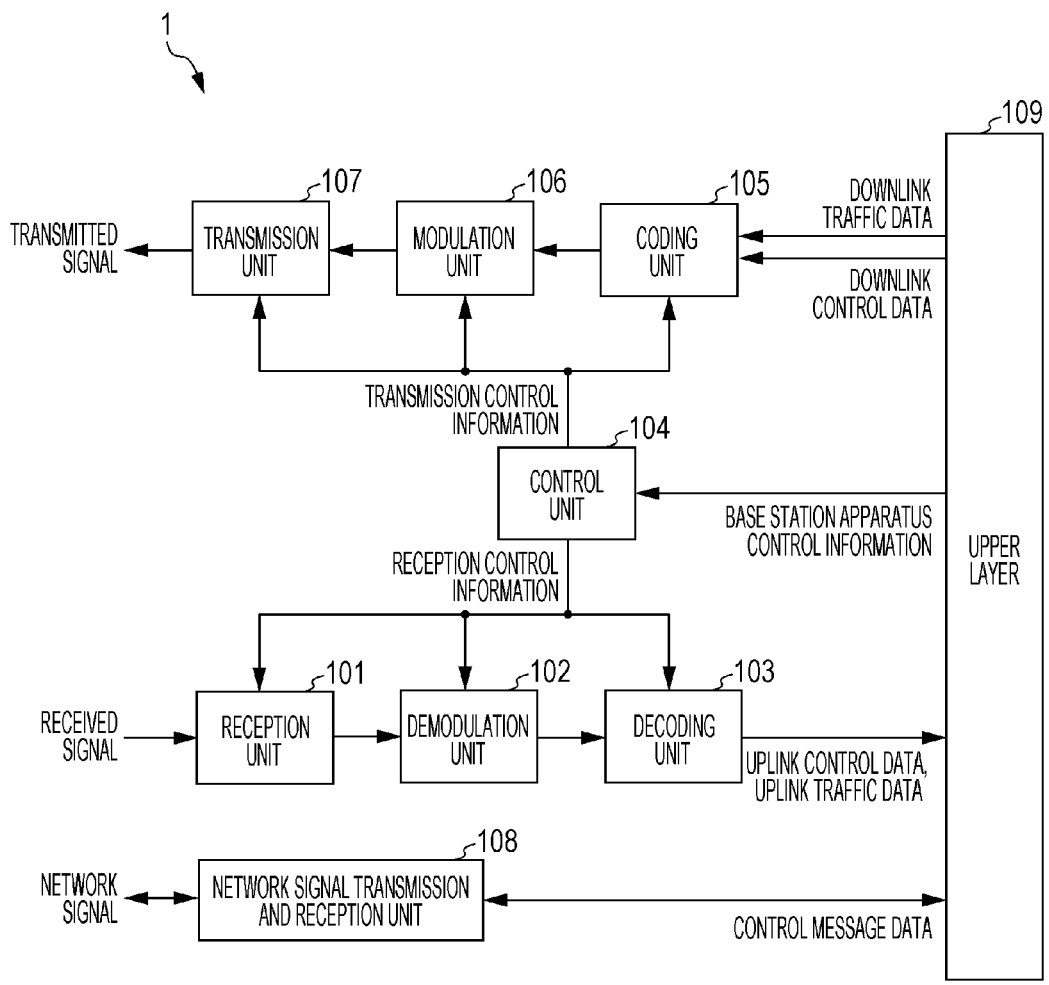
FIG. 1 is a block diagram illustrating one example of a base station apparatus according to an embodiment of the present invention.

Before describing each embodiment of the present invention, brief descriptions are given below to techniques related to each embodiment of the present invention.

[Physical Channel]

Descriptions are given to principal physical channels (or physical signals) used in EUTRA and Advanced EUTRA. A channel means a medium used for transmission of a signal, and a physical channel means a physical medium used for transmission of a signal. Although there is a possibility of adding a physical channel in EUTRA and Advanced EUTRA in the future or altering or adding an architecture and a form of format thereof, even a case of being altered or added does not affect the descriptions in each embodiment of the present invention.

In EUTRA and Advanced EUTRA, scheduling of a physical channel is managed using radio frames. One radio frame is 10 ms, and one radio frame is configured with 10 subframes. Further, one subframe is configured with two slots (that is, one slot is 0.5 ms). In addition, as a smallest unit of scheduling to arrange a physical channel, management is performed using resource blocks. A resource block is defined by a certain frequency domain having a frequency axis configured with a set of a plurality of subcarriers (for example, 12 subcarriers) and a domain configured with a certain transmission time interval (one slot).

Synchronization signals are configured with three types of primary synchronization signal and secondary synchronization signals configured with 31 types of code arranged alternately in the frequency domain, and combination of the signals of the primary synchronization signals and the secondary synchronization signals indicates 504 patterns of cell identifier (physical cell ID (physical cell identity; PCI)) to identify a base station apparatus and frame timing for radio synchronization. A mobile station apparatus specifies the cell ID of the received synchronization signal by cell search.

A physical broadcast information channel (physical broadcast channel; PBCH) is transmitted for the purpose of notifying control parameters (broadcast information and system information) used by mobile station apparatuses in the cell in common Among the broadcast information not notified by the physical broadcast information channel, a radio resource is notified by a physical downlink control channel and transmitted in a layer-3 message (system information) by a physical downlink shared channel. As the broadcast information, a cell global identifier (CGI) indicating an identifier of an individual cell, a tracking area identifier (TAI) managing an idle area by paging, random access configuration information (transmission timing timer and the like), common radio resource configuration information, and the like are notified.

Downlink reference signals are classified into a plurality of types depending on the use. For example, a cell-specific reference signal (CRS) is a pilot signal transmitted at predetermined power for each cell and a downlink reference signal periodically repeated in a frequency domain and a time domain based on predetermined rules. A mobile station apparatus measures received quality for each cell by receiving a cell-specific reference signal. In addition, a mobile station apparatus uses a down cell-specific reference signal also as a referential signal for demodulation of a physical downlink control channel transmitted simultaneously with the cell-specific reference signal or for demodulation of the physical downlink shared channel. As a sequence used for the cell-specific reference signal, a sequence identifiable for each cell is used.

In addition, a downlink reference signal is also used for estimation of downlink channel variation. The downlink reference signal used for estimation of channel variation is referred to as a channel state information reference signal (CSI-RS) or a CSI reference signal. In addition, a downlink reference signal individually configured for each mobile station apparatus is referred to as UE specific reference signals (URS) or dedicated RS (DRS) and used for demodulation of a physical downlink control channel or a physical downlink shared channel.

A physical downlink control channel (PDCCH) is transmitted in some OFDM symbols from the top of each subframe and used for the purpose of directing radio resource allocation information in accordance with scheduling of a base station apparatus and an adjustment amount of increasing or decreasing the transmission power to the mobile station apparatus. By monitoring a physical downlink control channel to the station itself before transmitting and receiving a layer-3 message (paging, handover command, and the like), which is downlink data and downlink control data, to receive the physical downlink control channel to the station itself, a mobile station apparatus has to obtain radio resource allocation information, called uplink grant when transmitted and downlink grant (downlink assignment) when received, from the physical downlink control channel. It is also possible to configure the physical downlink control channel to be transmitted in a domain of a resource block allocated in a dedicated manner from a base station apparatus to a mobile station apparatus other than being transmitted in the ODFM symbols described above.

A physical uplink control channel (PUCCH) is used to carry out notification of a reception acknowledgement response (acknowledgement/negative acknowledgement; ACK/NACK) of data transmitted in the physical downlink shared channel and downlink channel state information, and a scheduling request (SR), which is an uplink radio resource allocation request (radio resource request). The channel state information (CSI) includes a channel quality indicator (CQI), a precoding matrix indicator (PMI), a precoding type indicator (PTI), and a rank indicator (RI). There may be a case of expressing each indicator as indication, and the use and the meaning are the same.

The physical downlink shared channel (PDSCH) is also used for notification, to a mobile station apparatus, of broadcast information (system information) not notified by paging and the physical broadcast information channel as a layer-3 message as well as the downlink data. The radio resource allocation information of the physical downlink shared channel is indicated in the physical downlink control channel.

A physical uplink shared channel (PUSCH) mainly transmits uplink data and uplink control data, and it is also possible to include downlink received quality and control data, such as ACK/NACK. In addition, it is also used for notification, to a base station apparatus, of uplink control information as a layer-3 message as well as uplink data. In addition, similar to the case of downlink, the radio resource allocation information of the physical uplink shared channel is indicated in the physical downlink control channel.

An uplink reference signal (also referred to as an uplink pilot signal and an uplink pilot channel) includes a demodulation reference signal (DMRS) used for demodulation of the physical uplink control channel PUCCH and/or the physical uplink shared channel PUSCH by a base station apparatus and a sounding reference signal (SRS) used mainly for estimation of an uplink channel state by a base station apparatus. In addition, among sounding reference signals, there are a periodic sounding reference signal (periodic SRS) and an aperiodic sounding reference signal (aperiodic SRS).

A physical random access channel (PRACH) is a channel used for notification of a preamble sequence and has a guard time. A preamble sequence is configured to represent 6-bit information by preparing 64 types of sequence. A physical random access channel is used as a means of accessing a base station apparatus by a mobile station apparatus. A mobile station apparatus uses the physical random access channel to request a radio resource request when a physical uplink control channel is not configured and transmission timing adjustment information (also called timing advance; TA) desired for matching uplink transmission timing to a reception timing window of a base station apparatus to the base station apparatus.

Specifically, a mobile station apparatus transmits a preamble sequence using a radio resource for a physical random access channel configured by a base station apparatus. The mobile station apparatus receiving the transmission timing adjustment information configures a transmission timing timer that times an available time for the transmission timing adjustment information configured in common by the broadcast information (or configured individually by a layer-3 message) to manage the uplink state as a transmission timing adjustment state during the available time (during the timing) of the transmission timing timer and a transmission timing non-adjustment state (transmission timing unadjusted state) out of the available period (under suspension). A layer-3 message is a control-plane message exchanged between radio resource control (RRC) layers of a mobile station apparatus and a base station apparatus and used in the same meaning as RRC signaling or an RRC message. The other physical channels do not relate to each embodiment of the present invention, so that detailed descriptions are omitted.

[Measurement]

Figure 12:
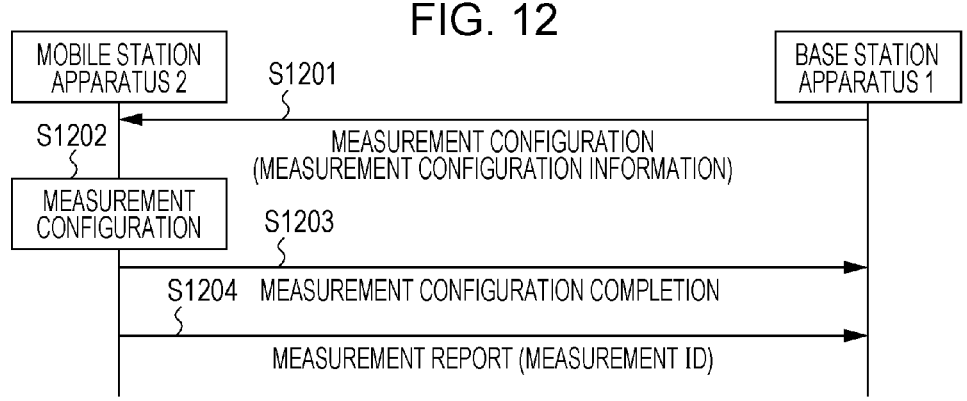
FIG. 12 is a sequence diagram illustrating one example of a conventional RRM measurement configuration management procedure.

FIG. 12 is a sequence diagram to illustrate a radio resource management (RRM) measurement configuration management method of a mobile station apparatus 2 and a base station apparatus 1 in EUTRA.

In the example of FIG. 12, the base station apparatus 1 is capable of using two different frequencies of F1 and F2 as frequencies operated by the station itself and the mobile station apparatus 2 and the base station apparatus 1 are in a state where radio connection is established (radio resource control connected: RRC_Connected) in the frequency F1. Here, the base station apparatus 1 transmits a message including a measurement configuration (hereinafter, referred to as a measurement configuration message) to cause measurement of received quality of the cell during communication (serving cell) and another cell (neighboring cell) to the mobile station apparatus 2 (step S1201). In a measurement configuration message, at least one item of measurement configuration information for each measured frequency (frequency F1 and frequency F2) is included. The measurement configuration information is configured with a measurement ID, a measurement object, a measurement object ID corresponding to the measurement object, a report configuration including a measurement event, and a report configuration ID corresponding to the report configuration. It may also be configured in such a manner that a plurality of report configuration IDs are linked to one measurement object ID. Similarly, it may also be configured in such a manner that one report configuration ID is linked to a plurality of measurement object IDs.

Figure 13:
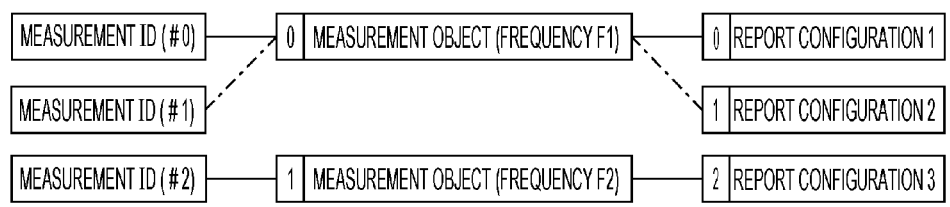
FIG. 13 is a diagram illustrating one example of a conventional RRM measurement configuration.

For example, descriptions are given to a case of notifying of two measurement objects (frequency F1 and frequency F2) and three report configurations and configuring three measurement IDs to combination of the measurement objects and the report configurations using FIG. 13.

The base station apparatus 1 allocates identifiers 0 and 1 as measurement object IDs respectively to the frequency F1 and the frequency F2 as measurement objects to notify the mobile station apparatus 2. In addition, the base station apparatus 1 allocates identifiers 0, 1, and 2 as report configuration IDs respectively to a report configuration 1, a report configuration 2, and a report configuration 3 as report configurations to notify the mobile station apparatus 2. Further, the base station apparatus 1 notifies the mobile station apparatus 2 of a measurement ID that is associated with (linked to) combination of the identifier of the measurement object and the identifier of the report configuration.

In FIG. 13, as a measurement ID #0, combination of the measurement object of the identifier 0 (frequency F1) and the report configuration of the identifier 0 is specified. Similarly, combination of the measurement object of the identifier 0 (frequency F1) and the report configuration of the identifier 1 is specified as a measurement ID #1, and combination of the measurement object of the identifier 1 (frequency F2) and the report configuration of the identifier 2 is specified as a measurement ID #2.

In addition, measurement event information is information configured with a measurement event indicating a condition, such as, for example, when the received quality of a cell-specific reference signal of a serving cell falls below/exceeds a predetermined threshold, when the received quality of a cell-specific reference signal of a neighboring cell falls below the serving cell, and the received quality of a neighboring cell exceeds a predetermined threshold, and a parameter used for judgment of the condition. To the parameter, information, such as a threshold, an offset value, and time for establishment of a measurement event, is configured. In NPL 3, it is defined to report as a measurement event A1, for example, in the case that received quality of a serving cell becomes better than a threshold. In addition, it is defined to report as a measurement event A3 in the case that received quality of an adjacent cell becomes better than one obtained by adding an offset value to the received quality of the serving cell. In addition, it is defined to report as a measurement event A4 in the case that the received quality of the adjacent cell becomes better than a threshold.

In step S1202, the mobile station apparatus 2 stores measurement configuration information configured from the base station apparatus 1 as internal information and then starts a measurement process. Specifically, as described before, the mobile station apparatus 2 manages a measurement ID, a measurement object ID, and a report configuration ID in association to be linked to one and starts measurement based on measurement information corresponding to each ID. In the case that these three IDs are linked to one, it is regarded as valid to start associated measurement, and in the case that these three IDs are not linked to one (in the case that any ID is not configured), it is regarded as invalid not to start the associated measurement. Then, in the case of successfully configuring measurement configuration information with no error, in step S1203, the mobile station apparatus 2 transmits a message indicating completion of the measurement configuration (measurement configuration completion message) to the base station apparatus 1.

Then, in the case that any of the configured measurement events satisfies the condition in accordance with the parameter, the mobile station apparatus 2 transmits a measurement report message to the base station apparatus 1 as the measurement event is triggered (step S1204). In the measurement report message, at least a measurement ID linked to the report configuration ID of the triggered measurement event and, if desired, a measurement result of the associated cell are configured to be reported. The base station apparatus 1 understands to which report configuration ID of the measurement event the measurement ID is linked, so that the mobile station apparatus 2 does not have to notify the report configuration ID in the measurement report message.

While considering the above issues, detailed descriptions are given below to preferred embodiments of the present invention with reference to the attached drawings. In the descriptions of embodiments of the present invention, when it is determined that specific descriptions on known functions and configurations associated with the embodiments of the present invention cause the scope of the embodiments of the present invention to be unclear, the detailed descriptions are omitted.

First Embodiment

Descriptions are given below to a first embodiment of the present invention.

FIG. 1 is a block diagram illustrating one example of the base station apparatus 1 by an embodiment of the present invention. The present base station apparatus 1 is configured with a reception unit 101, a demodulation unit 102, a decoding unit 103, a control unit 104, a coding unit 105, a modulation unit 106, a transmission unit 107, a network signal transmission and reception unit 108, and an upper layer 109.

The upper layer 109 outputs the downlink traffic data and the downlink control data to the coding unit 105. The coding unit 105 codes each item of the inputted data to output to the modulation unit 106. The modulation unit 106 carries out modulation of the signal inputted from the coding unit 105. In addition, a downlink reference signal is multiplexed into the signal modulated in the modulation unit 106 to be mapped as a signal in the frequency domain. The transmission unit 107 converts the signal inputted from the modulation unit 106 to a signal in the time domain to carry out power amplification with the converted signal embodied in a carrier wave at a given frequency and also transmission. A downlink data channel in which the downlink control data is arranged typically configures a layer-3 message (radio resource control (RRC) message).

In addition, the reception unit 101 converts the received signal from the mobile station apparatus 2 (refer to FIG. 2) to a baseband digital signal. The digital signal converted by the reception unit 101 is inputted to the demodulation unit 102 for demodulation. The signal demodulated by the demodulation unit 102 is subsequently inputted to the decoding unit 103 for decoding. The decoding unit 103 appropriately separates the received signal into uplink traffic data and uplink control data for respective outputs to the upper layer 109.

Base station apparatus control information for control of each of these blocks is inputted from the upper layer 109 to the control unit 104, and from the control unit 104, base station apparatus control information associated with transmission is inputted as transmission control information appropriately to each block of the coding unit 105, the modulation unit 106, and the transmission unit 107 and base station apparatus control information associated with reception as reception control information to each block of the reception unit 101, the demodulation unit 102, and the decoding unit 103.

In the meanwhile, the network signal transmission and reception unit 108 carries out transmission or reception of a control message between the plurality of base station apparatuses 1 (or control station devices (MME), gateway devices, MCE) and the base station apparatus 1. A control message is transmitted and received through a network line. A control message is exchanged at a logical interface called an S1 interface, an X2 interface, an M1 interface, and an M2 interface. In FIG. 1, other components of the base station apparatus 1 are not related to the present embodiment, and are omitted.

Figure 2:
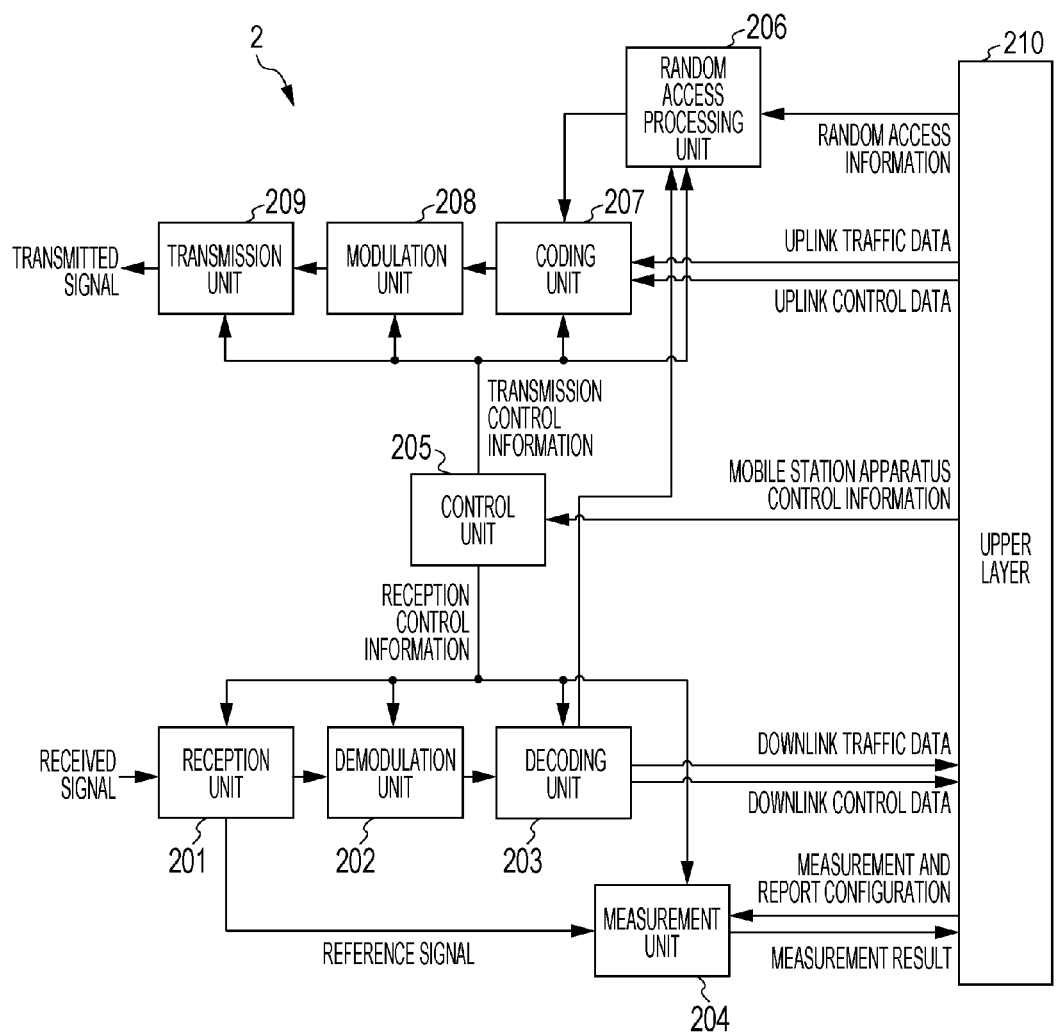
FIG. 2 is a block diagram illustrating one example of a mobile station apparatus according to an embodiment of the present invention.

FIG. 2 is a block diagram illustrating one example of the mobile station apparatus 2 according to an embodiment of the present invention. The present mobile station apparatus 2 is configured with a reception unit 201, a demodulation unit 202, a decoding unit 203, a measurement unit 204, a control unit 205, a random access processing unit 206, a coding unit 207, a modulation unit 208, a transmission unit 209, and an upper layer 210.

Prior to the reception, the upper layer 210 outputs mobile station apparatus control information to the control unit 205. The control unit 205 appropriately outputs mobile station apparatus control information related to reception, as the reception control information, to the reception unit 201, the demodulation unit 202, the decoding unit 203, and the measurement unit 204. In the reception control information, information, such as demodulation information, decoding information, information on a receiving frequency band, reception timing for each channel, a multiplex method, and radio resource arrangement information, is included as receive schedule information.

The reception unit 201 receives a signal from the base station apparatus 1 described later through one or more receivers, not shown, at a frequency band notified in the reception control information and converts the received signal to a baseband digital signal to output to the demodulation unit 202. In addition, the reception unit 201 outputs the received reference signal to the measurement unit 204. The demodulation unit 202 demodulates the received signal to output to the decoding unit 203. The decoding unit 203 correctly decodes the demodulated signal based on the reception control information and appropriately separate into downlink traffic data and downlink control data to output respectively to the upper layer 210. The measurement unit 204 measures RSRP, RSRQ, CSI, and the like of the received reference signal to output the measurement result to the upper layer 210.

In addition, prior to transmission, the upper layer 210 outputs mobile station apparatus control information to the control unit 205. The control unit 205 appropriately outputs mobile station apparatus control information related to transmission, as the transmission control information, to the random access processing unit 206, the coding unit 207, the modulation unit 208, and the transmission unit 209. In the transmission control information, information, such as coding information, modulation information, information on a transmission frequency band, transmission timing for each channel, a multiplex method, and radio resource arrangement information, is included as uplink scheduling information of a transmitted signal.

The upper layer 210 appropriately outputs uplink traffic data and uplink control data to the coding unit 207 in accordance with an uplink channel. The coding unit 207 appropriately codes each item of data in accordance with the transmission control information to output to the modulation unit 208. The modulation unit 208 carries out modulation of the signal coded in the coding unit 207. In addition, the modulation unit 208 multiplexes a downlink reference signal to the modulated signal to be mapped in a frequency band.

The transmission unit 209 converts the signal in the frequency band outputted from the modulation unit 208 to a signal in the time domain to carry out power amplification with the converted signal embodied in a carrier wave at a given frequency and also transmission from one or more transmitters, not shown.

In FIG. 2, other components of the mobile station apparatus 2 are not related to the present embodiment, and are omitted.

Figure 3:
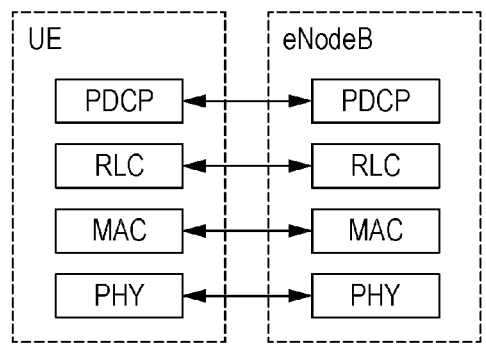
FIG. 3 is a diagram illustrating a user plane architecture of a base station apparatus and a mobile station apparatus according to an embodiment of the present invention.
Figure 4:
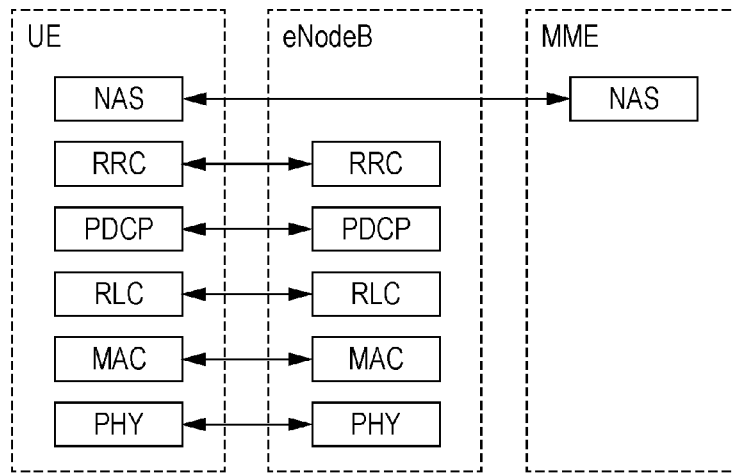
FIG. 4 is a diagram illustrating a control plane architecture of a base station apparatus and a mobile station apparatus according to an embodiment of the present invention.

Next, an architecture of radio interface protocol between a base station apparatus and a mobile station apparatus is illustrated. FIG. 3 is a block diagram illustrating a radio protocol architecture of a user plane (U-plane). FIG. 4 is a block diagram illustrating a radio protocol architecture of a control plane (C-plane). A user plane is a protocol stack for user data transmission and reception, and a control plane is a protocol stack for control signal transmission and reception.

In FIG. 3 and FIG. 4, in a physical layer (PHY) as a first layer (layer 1), communication is carried out using the physical channel described before between different physical layers, that is, between physical layers on a transmission side and a reception side. Physical layers are coupled to an upper medium access control (MAC) layer via a transport channel, and the physical layers carry out an information transfer service to the MAC layer via the transport channel.

In an MAC layer of a second layer (layer 2), mapping of a logical channel with a transport channel, error correction by hybrid automatic repeat request (HARQ), transfer process based on priority between logical channels, and the like are carried out. The MAC layer is coupled to a radio link control (RLC) layer, which is an upper layer, via the logical channel.

The RLC layer in the second layer supports reliability of data transfer. In the RLC layer, in accordance with the data transmission method, there are three types of operation mode of a transparent mode (TM), an unacknowledged mode (UM), and an acknowledged mode (AM). In AM, error correction by ARQ, protocol error detection, and the like are carried out.

A packet data convergence protocol (PDCP) layer in the second layer carries out header compression to reduce an IP packet header size, encryption of data, decoding of a cipher, and the like.

A radio resource control (RRC) layer in a third layer (layer 3) is defined only by a control plane. The RRC layer carries out broadcast of non-access stratum (NAS) and access stratum (AS) related information, management (establishment/maintenance/release) of RRC connection, configuration, re-configuration, and release of a radio bearer (RB), mobility (handover), management and report of measurement, QoS management, and the like.

The NAS layer located in an upper level of the RRC layer carries out session management, mobility management, and the like.

Here, the MAC layer and the RRC layer of the base station apparatus 1 exist as a part of the upper layer 109. In addition, the MAC layer of the mobile station apparatus 2 exists as a part of the random access processing unit 206 and the upper layer 209, and the RRC layer of the mobile station apparatus 2 exists as a part of the measurement unit 204 and the upper layer 209.

Subsequently, descriptions are given to a measurement configuration in the present embodiment using FIG. 5.

Similar to the conventional RRM measurement configuration described before, a measurement configuration in the present embodiment is configured with a measurement ID, a measurement object, a measurement object ID corresponding to the measurement object, a report configuration including a measurement event, and a report configuration ID corresponding to the report configuration. Further, in the present embodiment, definition is made to allow a configuration of a channel state information reference symbol to be included in the configuration of a measurement object.

Figure 5:
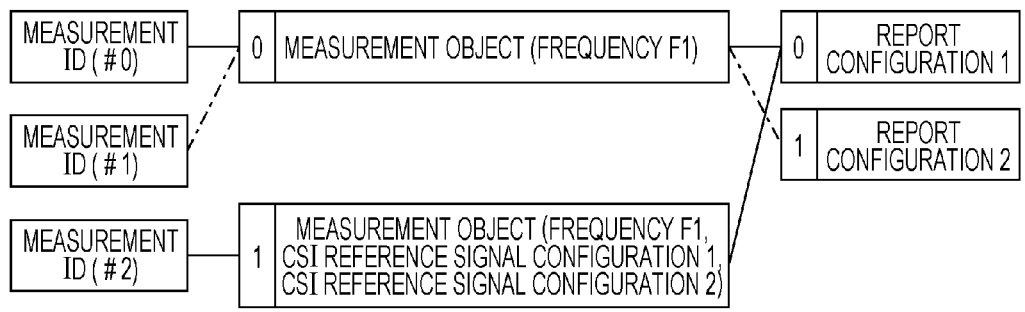
FIG. 5 is a diagram illustrating one example of a measurement configuration in a first embodiment of the present invention.

For example, in FIG. 5, two measurement objects are defined to the same frequency. One is what does not include a channel state information reference symbol configuration and the other is what includes one or more channel state information reference symbol configurations. Further, the measurement configuration includes two report configurations and three measurement IDs are configured for combination of the measurement object and the report configuration.

In FIG. 5, as the measurement ID #0, combination of the measurement object of the identifier 0 (frequency F1) and the report configuration of the identifier 0 is specified. Similarly, combination of the measurement object of the identifier 0 (frequency F1) and the report configuration of the identifier 1 is specified as the measurement ID #1, and combination of the measurement objects of the identifier 1 (frequency F1, a channel state information reference symbol configuration 1, a channel state information reference symbol configuration 2) and the report configuration of the identifier 0 is specified as a measurement ID #2.

Figure 6:
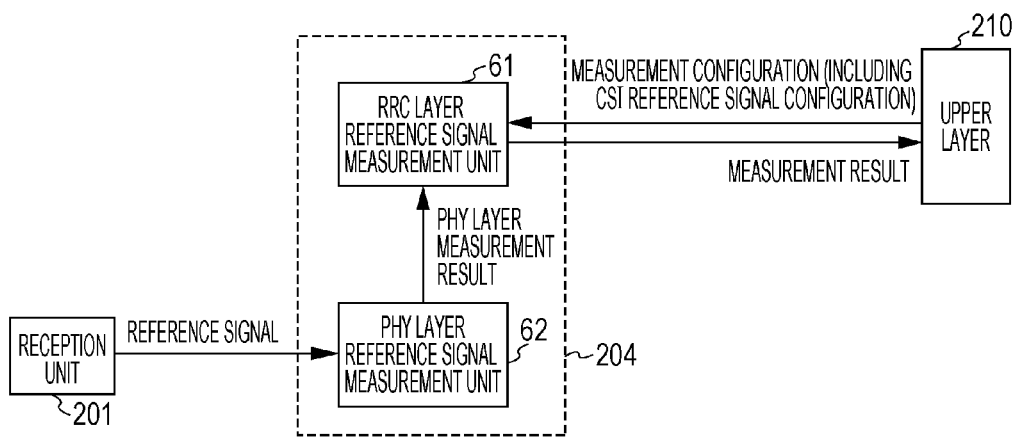
FIG. 6 is a block diagram illustrating one example of a measurement unit of a mobile station apparatus in a first embodiment of the present invention.

Subsequently, descriptions are given to the measurement unit 204 using FIG. 6.

The measurement unit 204 includes an RRC layer reference signal measurement unit 61 and a PHY layer reference signal measurement unit 62. The PHY layer reference signal measurement unit 62 measures the RSRP, the RSRQ, the channel state, and the like of the reference signal inputted from the reception unit 201 to notify the RRC layer reference signal measurement unit 61. In the measurement object configured by the measurement configuration notified from the upper layer 210, the RRC layer reference signal measurement unit 61 averages, if desired, individual measurement results notified from the PHY layer reference signal measurement unit 62 and carries out determination of whether or not to agree with the report configuration to notify the upper layer 210 of the measurement result. Here, the measurement unit 204 is controlled to carry out measurement of the cell-specific reference signals of the serving cell and an adjacent cell taking the report configuration as a configuration for RRM measurement in the case that the channel state information reference symbol configuration is not included in the measurement object of the measurement configuration notified from the upper layer 210 (notified from the base station apparatus 1), and in the case that the channel state information reference symbol configuration is included, to carry out measurement of the channel state information reference symbol configured by the serving cell taking the report configuration as a configuration for channel state information reference symbol management and measurement.

That is, in the example of measurement configuration illustrated in FIG. 5, the measurement ID #0 and the measurement ID #2 are at the same frequency and have the same report configuration while definition of the serving cell and the adjacent cell specified in the report configuration is altered. In the measurement ID #0, similar to the conventional RRM measurement, the cell-specific reference signals of the serving cell and the adjacent cell are detected at the frequency of the measurement object for measurement, while in the measurement ID #2, measurement is made by taking the channel state information reference symbols (CSI reference signal configuration 1, CSI reference signal configuration 2) configured by the measurement object as two independent reference signals of an adjacent cell in the serving cell at the frequency configured by the measurement object. Further, in the measurement ID #2, in the case that the received quality, such as the measurement event A1 and the measurement event A3 described before in the report configuration, of the serving cell is included in the conditions, the channel state information reference symbol that is utilized for intercell cooperative communication of the serving cell at the frequency specified by the measurement object and is used to obtain the downlink channel state information is configured as the reference signal of the serving cell. In the case that there is no channel state information reference symbol that is utilized for intercell cooperative communication of the serving cell at the frequency specified by the measurement object and is used to obtain the downlink channel state information, the measurement (measurement ID #2) does not have to be carried out. Here, in the case that a plurality of channel state information reference symbols used to obtain the downlink channel state information are configured, a channel state information reference symbol of the highest received quality may also be configured, a channel state information reference symbol of the lowest received quality may also be configured, an average of the received quality of all channel state information reference symbols may also be the received quality, and a channel state information reference symbol to be used may also be specified from the base station apparatus by RRC signaling. In addition, the channel state information reference symbol used to obtain the downlink channel state information may be specified in physical parameter configurations, such as PhysicalConfigDedicated, may also be specified in a newly configured parameter configuration (such as csi-RS-Config-r11), and may also be specified in a configuration for feedback of the channel state information (such as cqi-ReportConfig).

In addition, the channel state information reference symbol configuration may also be notified so as to have a physical parameter desired for measurement (such as arrangement information) included in the configuration of the measurement object, and may also be notified, by notifying the physical parameter (such as arrangement information) together with an identifier that is capable of identifying a plurality of channel state information reference symbol configurations using an information element of PhysicalConfigDedicated and PhysicalConfigDedicatedS-Cell-r10, so as to have the identifier included in the configuration of the measurement object.

Subsequently, descriptions are given to a measurement procedure in a communication system of the present embodiment using FIG. 7.

Figure 7:
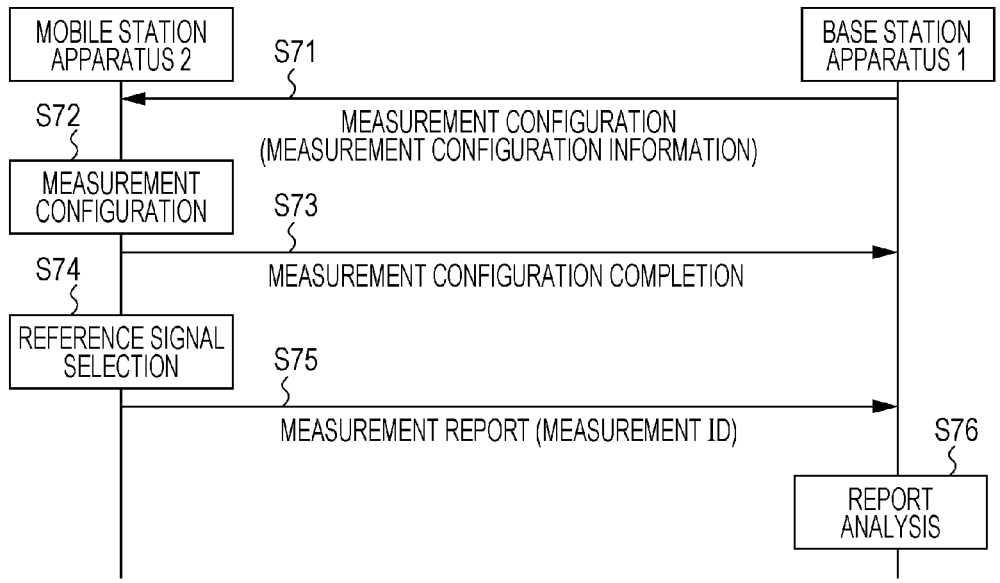
FIG. 7 is a flowchart illustrating one example of a measurement configuration procedure in the first embodiment and a second embodiment of the present invention.

In FIG. 7, firstly, the base station apparatus 1 notifies the mobile station apparatus 2 of a measurement configuration including measurement configuration information using an RRC message (step S71).

The mobile station apparatus 2 notified of the measurement configuration information in step S71 stores the notified measurement configuration information as internal information and starts a measurement process based on the measurement configuration information (step S72). Specifically, the mobile station apparatus 2 manages a measurement ID, an identifier of a measurement object, and an identifier of a report configuration by associating them into one for measurement. In the case that the identifier of the measurement object and the identifier of the report configuration associated with the measurement ID exist, the configuration is regarded as valid and measurement of the associated measurement object is carried out, and in the case that either one or both of the identifier of the measurement object and the identifier of the report configuration associated with the measurement ID do not exist, the configuration is regarded as invalid and measurement associated with the measurement ID is not carried out. Then, in the case of successfully configuring the measurement configuration information with no error, the mobile station apparatus 2 notifies the base station apparatus 1 of measurement configuration completion (step S73). Here, in order to make the measurement configuration message for channel state information reference symbol management and measurement in common with a message for conventional RRM measurement, the mobile station apparatus 2 may handle some parameters of the measurement configuration as invalid in the case that the configuration of the channel state information reference symbol is included in the configuration of the measurement object, and may also regard the measurement configuration as invalid in the case of inconsistent configurations. For example, it is possible to select reference signal received power (RSRP) and received signal received quality (RSRQ) as specification of the received quality used for measurement (triggerQuantity) in the measurement configuration of the RRM measurement while, in a communication system where only RSRP is used for measurement using a channel state information reference symbol, the configuration of triggerQuantity may also be ignored in the case that the configuration of the channel state information reference symbol is included in the configuration of the measurement object and the measurement configuration may also be regarded as invalid when the configuration of triggerQuantity is RSRQ.

The RRC layer reference signal measurement unit 61 determines whether or not a channel state information reference symbol configuration is included in the configuration of the measurement object for each measurement ID to select a reference signal used in measurement of the measurement ID. Further, in the case that a channel state information reference symbol configuration is included in the configuration of the measurement object, the RRC layer reference signal measurement unit 61 alters the definition of a reference signal of the serving cell and a reference signal of the adjacent cell (step S74).

After that, the mobile station apparatus 2 starts measurement of the reference signal, and in the case of satisfying the condition of the report configuration, transmits the measurement report to the base station apparatus 1 using an RRC message (step S75). At least the measurement ID is included in the measurement report, and in the case that one or more channel state information reference symbol configurations are included in the measurement object, the identifier that is capable of identifying the plurality of channel state information reference symbol configurations may also be included in the measurement report. In this case, in order to make a message for the measurement report in common with a conventional message (MeasResults), the identifier may also be reported as a physical cell identifier (physCellId) to the base station apparatus 1.

In addition, in order to make the message for the measurement report in common with the conventional message (MeasResults), in the case that the measurement report includes received quality information of the serving cell (measResultPCell), the received quality of the cell-specific reference signal of the serving cell may be configured in measResultPCell similar to the past when the channel state information reference symbol configuration is not included in the configuration of the measurement object, and the received quality of the channel state information reference symbol may also be configured in measResultPCell when the channel state information reference symbol configuration is included in the configuration of the measurement object. Here, the channel state information reference symbol used for measurement of measResultPCell is a channel state information reference symbol that is utilized for intercell cooperative communication of the serving cell and used to obtain the downlink channel state information, and in the case that the plurality of channel state information reference symbols used to obtain downlink channel state information are configured, a channel state information reference symbol of the highest received quality may be configured, a channel state information reference symbol of the lowest received quality may also be configured, an average of the received quality of all channel state information reference symbols may also be the received quality, and a channel state information reference symbol to be used may also be specified from the base station apparatus by RRC signaling. In addition, the received quality may be an average value of received power of given one or a plurality of antenna ports, may also be the best value, and may also be the lowest value. In addition, the channel state information reference symbol used to obtain downlink channel state information may be specified in the physical parameter configurations, such as PhysicalConfigDedicated, may also be specified in a newly configured parameter configuration (such as csi-RS-Configr11), and may also be specified in the configurations for feedback of the channel state information (such as cqi-ReportConfig). It is possible that the base station apparatus 1 having received the measurement report determines whether measResultPCell is the received quality of a cell-specific reference signal or the received quality of the channel state information reference symbol from the measurement ID included in the measurement report. In addition, regardless of whether or not a channel state information reference symbol configuration is included in the configuration of the measurement object, the received quality of the cell-specific reference signal of the serving cell may also be configured in measResultPCell.

The base station apparatus 1 that has received the measurement report from the mobile station apparatus 2 identifies, in step S76, whether the reported measurement report is a conventional RRM measurement report or a channel state information reference symbol management and measurement report from the measurement ID included in the measurement report. In addition, in the case that a measured value is included in the measurement report, whether a measured value of the cell-specific reference signal or a measured value of the channel state information reference symbol is determined from the measurement ID included in the measurement report. In addition, in a communication system where an identifier to identify a channel state information reference symbol configuration is reported as a physical cell identifier, in the case that a physical cell identifier is included in the measurement report, whether a physical cell identifier of the adjacent cell or an identifier of the channel state information reference symbol configuration is determined from the measurement ID included in the measurement report.

As described above, it is possible to add a mechanism of channel state information reference symbol management and measurement with minor alterations to the mechanism of conventional RRM measurement without newly defining a message dedicated to channel state information reference symbol management and measurement by carrying out selection of a reference signal to be measured and alteration of the report configuration interpretation in the mobile station apparatus 2 and carrying out alterations of measurement report interpretation in the base station apparatus 1 based on whether or not a channel state information reference symbol configuration is included in the configuration of the measurement object.

Second Embodiment

Descriptions are given below to a second embodiment of the present invention. While the example of selecting a reference signal used for measurement by whether or not a channel state information reference symbol configuration is included in the configuration of the measurement object is shown in the first embodiment, an example of selecting a reference signal to be used for measurement based on information included in the report configuration in the case that a channel state information reference symbol configuration is included in the configuration of the measurement object is shown in the present embodiment.

The communication system (base station apparatus 1 and mobile station apparatus 2) used in the descriptions in the present embodiment is similar to FIG. 1 and FIG. 2 in the first embodiment, respectively, so that the detailed descriptions are not repeated.

Subsequently, descriptions are given to a measurement configuration in the present embodiment using FIG. 8.

The measurement configuration in the present embodiment is configured with, similar to the conventional RRM measurement configuration described before, a measurement ID, a measurement object, a measurement object ID corresponding to the measurement object, a report configuration including a measurement event, and a report configuration ID corresponding to the report configuration. Further, in the present embodiment, definition is given to include a configuration of a channel state information reference symbol in the configuration of the measurement object and to include a 1-bit identification bit in the report configuration.

Figure 8:
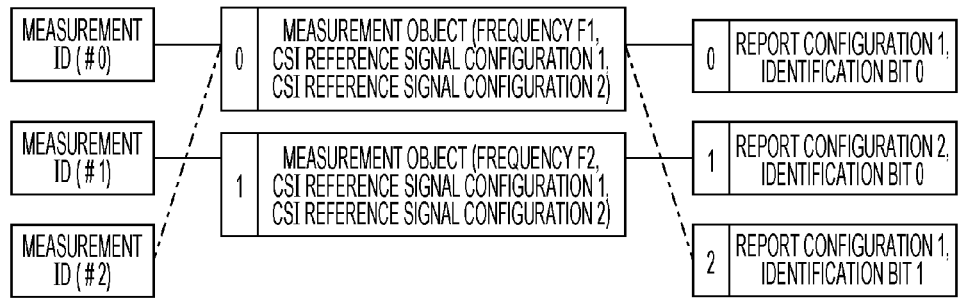
FIG. 8 is a diagram illustrating one example of a measurement configuration in the second embodiment of the present invention.

For example, in FIG. 8, two measurement objects including a channel state information reference symbol configuration are defined in the measurement configuration. Further, two report configurations are included in the measurement configuration, and there are two types of report configuration 1 that are an identification bit 0 and an identification bit 1.

In FIG. 8, combination of the measurement object of the identifier 0 (frequency F1, CSI reference signal configuration) and the report configuration of the identifier 0 (report configuration 1, identification bit 0) is specified as a measurement ID #0. Similarly, combination of the measurement object of the identifier 1 (frequency F2, CSI reference signal configuration) and the report configuration of the identifier 1 (report configuration 2, identification bit 0) is specified as the measurement ID #1, and combination of the measurement object of the identifier 0 (frequency F1, CSI reference signal configuration) and the report configuration of the identifier 2 (report configuration 1, identification bit 1) is specified as the measurement ID #2.

Figure 9:
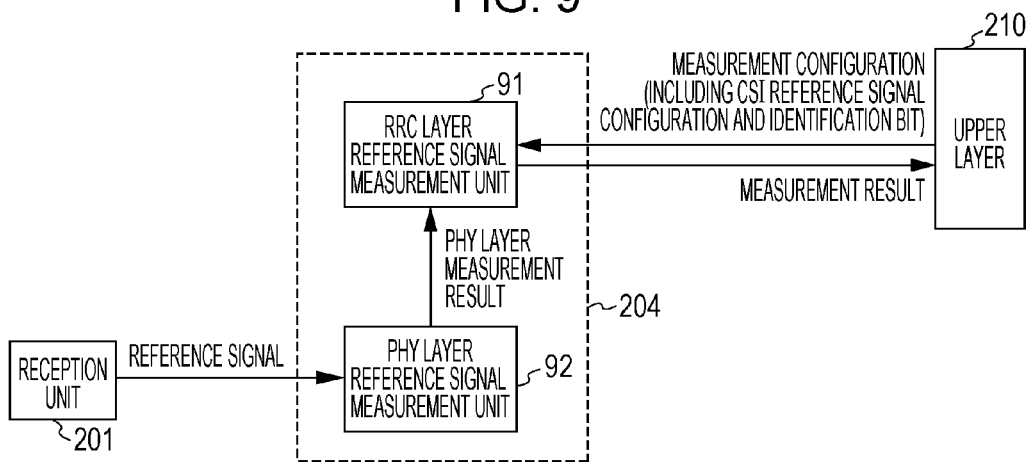
FIG. 9 is a block diagram illustrating one example of a measurement unit of a mobile station apparatus in the second embodiment of the present invention.

Subsequently, descriptions are given to the measurement unit 204 using FIG. 9.

The measurement unit 204 includes an RRC layer reference signal measurement unit 91 and a PHY layer reference signal measurement unit 92. The PHY layer reference signal measurement unit 92 measures the RSRP, the RSRQ, the channel state, and the like of the reference signal inputted from the reception unit 201 to notify the RRC layer reference signal measurement unit 91. In the measurement object configured by the measurement configuration notified from the upper layer 210, the RRC layer reference signal measurement unit 91 averages, if desired, individual measurement results notified from the PHY layer reference signal measurement unit 92 and carries out determination of whether or not to agree with the report configuration to notify the upper layer 210 of the measurement result. Here, the measurement unit 204 is controlled to carry out measurement of the cell-specific reference signals of the serving cell and an adjacent cell taking the report configuration as a configuration for RRM measurement in the case that the identification bit of the report configuration of the measurement configuration notified from the upper layer 210 (notified from the base station apparatus 1) is 0, and in the case that the identification bit is 1, to carry out measurement of the channel state information reference symbol configured by the serving cell taking the report configuration as a configuration for channel state information reference symbol management and measurement. Alternatively, control may also be made to carry out measurement of the channel state information reference symbol configured by the serving cell in the case that the identification bit is included in the report configuration and to carry out measurement of the cell-specific reference signals of the serving cell and the adjacent cell in the case that the identification bit is not included. In addition, in the case that the channel state information reference symbol configuration is not included in the configuration of the measurement object even when the identification bit is 1, the cell-specific reference signals of the serving cell and the adjacent cell may also be measured. In addition, the identification bit may be boolean. That is, instead of 0 and 1, there may also be two values of true and false. In addition, the identification bit may also be a part of enumerated data.

In the example of the measurement configuration illustrated in FIG. 8, although the measurement ID #0 and the measurement ID #2 are at the same frequency and have the same report configuration, the cell-specific reference signals of the serving cell and the adjacent cell are detected for measurement at the frequency of the measurement object similar to conventional RRM measurement in the measurement ID #0 while, in the measurement ID #2, channel state information reference symbols (CSI reference signal configuration 1, CSI reference signal configuration 2) configured by the same measurement object are measured taking them as two independent reference signals of the adjacent cell in the serving cell at the frequency configured by the measurement object. Further, in the measurement ID #2, in the case that received quality, such as the measurement event A1 and the measurement event A3 described before, of the serving cell is included in the condition of the report configuration, the channel state information reference symbol utilized for intercell cooperative communication of the serving cell at the frequency specified by the measurement object and used to obtain downlink channel state information is configured as a reference signal of the serving cell. In the case that the channel state information reference symbol utilized for intercell cooperative communication of the serving cell at the frequency specified by the measurement object and used to obtain downlink channel state information does not exist, the measurement (measurement ID #2) does not have to be carried out. Here, in the case that a plurality of channel state information reference symbols used to obtain the downlink channel state information are configured, a channel state information reference symbol of the highest received quality may also be configured, a channel state information reference symbol of the lowest received quality may also be configured, an average of the received quality of all channel state information reference symbols may also be the received quality, and a channel state information reference symbol to be used may also be specified from the base station apparatus by RRC signaling. In addition, the received quality may be an average value of received power of given one or a plurality of antenna ports, may also be the best value, and may also be the lowest value. In addition, the channel state information reference symbol used to obtain downlink channel state information may be specified in the physical parameter configurations, such as PhysicalConfigDedicated, may also be specified in a newly configured parameter configuration (such as csi-RS-Config-r11), and may also be specified in the configurations for feedback of the channel state information (such as cqi-ReportConfig).

In addition, the channel state information reference symbol configuration may also be notified so as to have a physical parameter desired for measurement (such as arrangement information) included in the configuration of the measurement object, and may also be notified, by notifying the physical parameter (such as arrangement information) together with an identifier that is capable of identifying a plurality of channel state information reference symbol configurations using an information element of PhysicalConfigDedicated and PhysicalConfigDedicatedS-Cell-r10, so as to have the identifier included in the configuration of the measurement object.

Subsequently, descriptions are given to a measurement procedure in the communication system of the present embodiment using FIG. 7 similar to the first embodiment.

In FIG. 7, firstly, the base station apparatus 1 notifies the mobile station apparatus 2 of a measurement configuration (step S71).

The mobile station apparatus 2 notified of the measurement configuration information in step S71 stores the notified measurement configuration information as internal information (step S72). Specifically, the mobile station apparatus 2 manages a measurement ID, an identifier of a measurement object, and an identifier of a report configuration by associating them into one for measurement. In the case that the identifier of the measurement object and the identifier of the report configuration associated with the measurement ID exist, the configuration is regarded as valid and measurement of the associated measurement object is carried out, and in the case that either one or both of the identifier of the measurement object and the identifier of the report configuration associated with the measurement ID do not exist, the configuration is regarded as invalid and measurement associated with the measurement ID is not carried out. Then, in the case of successfully configuring the measurement configuration information with no error, the mobile station apparatus 2 notifies the base station apparatus 1 of measurement configuration completion (step S73). Here, in order to make the measurement configuration message for channel state information reference symbol management and measurement in common with a message for conventional RRM measurement, the mobile station apparatus 2 may handle some parameters of the measurement configuration as invalid in the case that the identification bit is 1, and may also regard the measurement configuration as invalid in the case of inconsistent configurations. For example, it is possible to select reference signal received power (RSRP) and received signal received quality (RSRQ) as specification of the received quality used for measurement (triggerQuantity) in the measurement configuration of the RRM measurement while, in a communication system where only RSRP is used for measurement using a channel state information reference symbol, the configuration of triggerQuantity may also be ignored in the case that the identification bit is 1 and the measurement configuration may also be regarded as invalid when the configuration of triggerQuantity is RSRQ.

The RRC layer reference signal measurement unit 91 acknowledges the identification bit of the report configuration for each measurement ID to select a reference signal used in measurement of the measurement ID. Further, in the case that the identification bit is 1, it alters the definition of a reference signal of the serving cell and a reference signal of the adjacent cell (step S74).

After that, the mobile station apparatus 2 starts measurement of the reference signal, and in the case of satisfying the condition of the report configuration, transmits the measurement report to the base station apparatus 1 using an RRC message (step S75).

At least the measurement ID is included in the measurement report, and in the case that the identification bit is 1, the identifier that is capable of identifying the channel state information reference symbol configurations may also be included in the measurement report. In this case, in order to make a message for the measurement report in common with a conventional message (MeasResults), the identifier may also be reported as a physical cell identifier (physCellId) to the base station apparatus 1.

In addition, in order to make the message for the measurement report in common with the conventional message (MeasResults), in the case that the measurement report includes received quality information of the serving cell (measResultPCell), the received quality of the cell-specific reference signal of the serving cell is configured in measResultPCell similar to the past when the identification bit is 0, and the received quality of the channel state information reference symbol may also be configured in measResultPCell when the identification bit is 1. Here, the channel state information reference symbol used for measurement of measResultPCell is a channel state information reference symbol that is utilized for intercell cooperative communication of the serving cell and used to obtain the downlink channel state information, and in the case that the plurality of channel state information reference symbols used to obtain downlink channel state information are configured, a channel state information reference symbol of the highest received quality may be configured, a channel state information reference symbol of the lowest received quality may also be configured, an average of the received quality of all channel state information reference symbols may also be the received quality, and a channel state information reference symbol to be used may also be specified from the base station apparatus by RRC signaling. In addition, the received quality may be an average value of received power of given one or a plurality of antenna ports, may also be the best value, and may also be the lowest value. In addition, the channel state information reference symbol used to obtain downlink channel state information may be specified in the physical parameter configurations, such as PhysicalConfigDedicated, may also be specified in a newly configured parameter configuration (such as csi-RS-Config-r11), and may also be specified in the configurations for feedback of the channel state information (such as cqi-ReportConfig). It is possible that the base station apparatus 1 having received the measurement report determines whether measResultPCell is the received quality of a cell-specific reference signal or the received quality of the channel state information reference symbol from the measurement ID included in the measurement report. In addition, regardless of the value of the identification bit, the received quality of the cell-specific reference signal of the serving cell may also be configured in measResultPCell.

The base station apparatus 1 that has received the measurement report from the mobile station apparatus 2 identifies, in step S76, whether the reported measurement report is a conventional RRM measurement report or a channel state information reference symbol management and measurement report from the measurement ID included in the measurement report. In addition, in the case that a measured value is included in the measurement report, whether a measured value of the cell-specific reference signal or a measured value of the channel state information reference symbol is determined from the measurement ID included in the measurement report. In addition, in a communication system where an identifier to identify a channel state information reference symbol configuration is reported as a physical cell identifier, in the case that a physical cell identifier is included in the measurement report, whether a physical cell identifier of the adjacent cell or an identifier of the channel state information reference symbol configuration is determined from the measurement ID included in the measurement report.

As described above, similar to the first embodiment, it is possible to add a mechanism of channel state information reference symbol management and measurement with minor alterations to the mechanism of conventional RRM measurement without newly defining a message dedicated to channel state information reference symbol management and measurement by carrying out selection of a reference signal to be measured and alteration of the report configuration interpretation in the mobile station apparatus 2 and carrying out alterations of measurement report interpretation in the base station apparatus 1 based on an identification bit, which is included in a report configuration for reference signal selection. Further, even in the case that the channel state information reference symbol is configured, it is possible to switch between measurement of a cell-specific reference signal and measurement of a channel state information reference symbol as desired.

Third Embodiment

Descriptions are given below to a third embodiment of the present invention. An example different from the second embodiment in which a reference signal to be used for measurement is selected based on information included in the report configuration in the case that a channel state information reference symbol configuration is included in the configuration of the measurement object is shown in the present embodiment.

The communication system (base station apparatus 1 and mobile station apparatus 2) used in the descriptions in the present embodiment is similar to FIG. 1 and FIG. 2 in the first embodiment, respectively, so that the detailed descriptions are not repeated.

Subsequently, descriptions are given to a measurement configuration in the present embodiment using FIG. 10.

The measurement configuration in the present embodiment is configured with, similar to the conventional RRM measurement configuration described before, a measurement ID, a measurement object, a measurement object ID corresponding to the measurement object, a report configuration including a measurement event, and a report configuration ID corresponding to the report configuration. Further, in the present embodiment, definition is given to include a configuration of a channel state information reference symbol in the configuration of the measurement object and to allow new inclusion of a measurement event for channel state information reference symbol management and measurement as a measurement event of the report configuration.

For example, in FIG. 8, two measurement objects including a channel state information reference symbol configuration are defined in the measurement configuration. Further, three report configurations are included in the measurement configuration, and a report configuration 1 and a report configuration 2 are conventional measurement events to carry out measurement using a cell-specific reference signal and a report configuration 3 is a measurement event for channel state information reference symbol management and measurement that is newly defined.

In FIG. 8, combination of the measurement object of the identifier 0 (frequency F1, CSI reference signal configuration) and the report configuration 1 of the identifier 0 is specified as a measurement ID #0. Similarly, combination of the measurement object of the identifier 1 (frequency F2, CSI reference signal configuration) and the report configuration 2 of the identifier 1 is specified as the measurement ID #1, and combination of the measurement object of the identifier 0 (frequency F1, CSI reference signal configuration) and the report configuration 3 of the identifier 2 is specified as the measurement ID #2.

Figure 11:
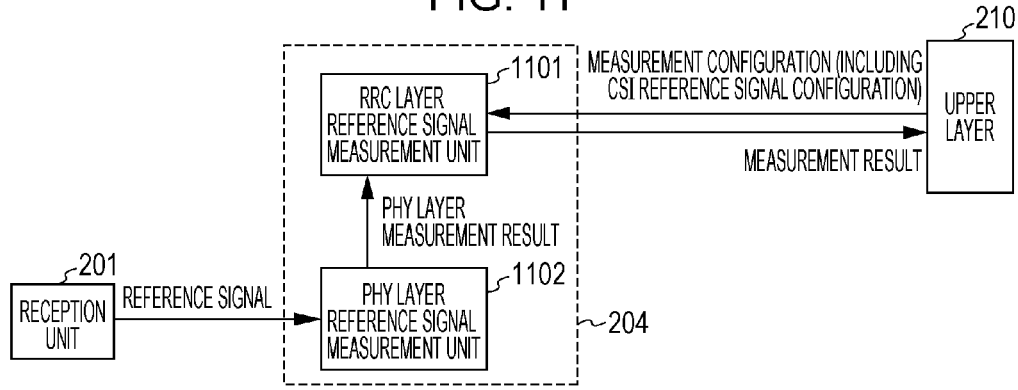
FIG. 11 is a block diagram illustrating one example of a measurement unit of a mobile station apparatus in the third embodiment of the present invention.

Subsequently, descriptions are given to the measurement unit 204 using FIG. 11.

The measurement unit 204 includes an RRC layer reference signal measurement unit 1101 and a PHY layer reference signal measurement unit 1102. The PHY layer reference signal measurement unit 1102 measures the RSRP, the RSRQ, the channel state, and the like of the reference signal inputted from the reception unit 201 to notify the RRC layer reference signal measurement unit 1101. In the measurement object configured by the measurement configuration notified from the upper layer 210, the RRC layer reference signal measurement unit 1101 averages, if desired, individual measurement results notified from the PHY layer reference signal measurement unit 1102 and carries out determination of whether or not to agree with the report configuration to notify the upper layer 210 of the measurement result. Here, the measurement unit 204 is controlled to carry out measurement of the cell-specific reference signals of the serving cell and an adjacent cell in the case that the measurement event of the report configuration of the measurement configuration notified from the upper layer 210 (notified from the base station apparatus 1) is a conventional measurement event to carry out measurement of a cell-specific reference signal, and in the case that the measurement event of the measurement configuration is the measurement event to carry out the measurement of the channel state information reference symbol, to carry out measurement of the channel state information reference symbol configured by the serving cell. Here, the measurement event to carry out the measurement of the channel state information reference symbol may include a report in the case that the received quality of the channel state information reference symbol exceeds a threshold configured in the report configuration (Configured CSI RS becomes better than threshold), a report in the case that the received quality of the channel state information reference symbol falls below a threshold configured in the report configuration (Configured CSI RS becomes worse than threshold), and a report in the case that the received quality of the channel state information reference symbol used in intercell cooperative communication (used to obtain downlink channel state information) exceeds/falls below a threshold configured in the report configuration. The channel state information reference symbol used in the intercell cooperative communication may be a channel state information reference symbol specified in the physical parameter configurations, such as PhysicalConfigDedicated, may also be a channel state information reference symbol specified in a newly configured parameter configuration (such as csi-RS-Config-r11), and may also be a channel state information reference symbol specified in the configurations for feedback of the channel state information (such as cqi-ReportConfig). In this case, the channel state reference signal configuration does not have to be included in the measurement object. In addition, the received quality may be an average value of received power of given one or a plurality of antenna ports, may also be the best value, and may also be the lowest value.

Figure 10:
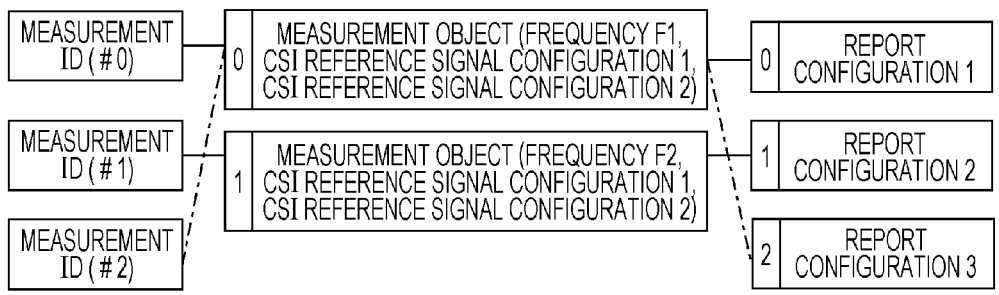
FIG. 10 is a diagram illustrating one example of a measurement configuration in a third embodiment of the present invention.

In the example of the measurement configuration illustrated in FIG. 10, although the measurement ID #0 and the measurement ID #2 have the same measurement object, the cell-specific reference signals of the serving cell and the adjacent cell are detected for measurement at the frequency of the measurement object as a conventional measurement event in the measurement ID #0 while, in the measurement ID #2, channel state information reference symbols (CSI reference signal configuration 1, CSI reference signal configuration 2) configured by the same measurement object are measured in the serving cell at the frequency configured by the measurement object.

In addition, the channel state information reference symbol configuration may also be notified so as to have a physical parameter desired for measurement (such as arrangement information) included in the configuration of the measurement object, and may also be notified, by notifying the physical parameter (such as arrangement information) together with an identifier that is capable of identifying a plurality of channel state information reference symbol configurations using an information element of PhysicalConfigDedicated and PhysicalConfigDedicatedSCell-r10, so as to have the identifier included in the configuration of the measurement object.

Subsequently, descriptions are given to a measurement procedure in the communication system of the present embodiment using FIG. 7 similar to the first embodiment.

In FIG. 7, firstly, the base station apparatus 1 notifies the mobile station apparatus 2 of a measurement configuration (step S71).

The mobile station apparatus 2 notified of the measurement configuration information in step S71 stores the notified measurement configuration information as internal information (step S72). Specifically, the mobile station apparatus 2 manages a measurement ID, an identifier of a measurement object, and an identifier of a report configuration by associating them into one for measurement. In the case that the identifier of the measurement object and the identifier of the report configuration associated with the measurement ID exist, the configuration is regarded as valid and measurement of the associated measurement object is carried out, and in the case that either one or both of the identifier of the measurement object and the identifier of the report configuration associated with the measurement ID do not exist, the configuration is regarded as invalid and measurement associated with the measurement ID is not carried out. Then, in the case of successfully configuring the measurement configuration information with no error, the mobile station apparatus 2 notifies the base station apparatus 1 of measurement configuration completion (step S73). Here, in order to make the measurement configuration message for channel state information reference symbol management and measurement in common with a message for conventional RRM measurement, the mobile station apparatus 2 may handle some parameters of the measurement configuration as invalid in the case that the measurement event of the measurement configuration is the measurement event to carry out the measurement of the channel state information reference symbol, and may also regard the measurement configuration as invalid in the case of inconsistent configurations. For example, it is possible to select reference signal received power (RSRP) and received signal received quality (RSRQ) as specification of the received quality used for measurement (triggerQuantity) in the measurement configuration of the RRM measurement while, in a communication system where only RSRP is used for measurement using a channel state information reference symbol, the configuration of triggerQuantity may also be ignored in the case that the measurement event of the measurement configuration is the measurement event to carry out the measurement of the channel state information reference symbol and the measurement configuration may also be regarded as invalid when the configuration of triggerQuantity is RSRQ.

The RRC layer reference signal measurement unit 1101 acknowledges the measurement event of the report configuration for each measurement ID to select a reference signal used in measurement of the measurement ID. (step S74).

After that, the mobile station apparatus 2 starts measurement of the reference signal, and in the case of satisfying the condition of the report configuration, transmits the measurement report to the base station apparatus 1 using an RRC message (step S75). At least the measurement ID is included in the measurement report, and in the case that it is a measurement event of the channel state information reference symbol management and measurement, the identifier that is capable of identifying the channel state information reference symbol configurations may also be included in the measurement report. In this case, in order to make a message for the measurement report in common with a conventional message (MeasResults), the identifier may also be reported as a physical cell identifier (physCellId) to the base station apparatus 1.

In addition, in order to make the message for the measurement report in common with the conventional message (MeasResults), in the case that the measurement report includes received quality information of the serving cell (measResultPCell), the received quality of the cell-specific reference signal of the serving cell is configured in measResultPCell similar to the past when the measurement event is a measurement event of the cell-specific reference signal, and the received quality of the channel state information reference symbol may also be configured in measResultPCell when the measurement event is a measurement event of the channel state information reference symbol. Here, the channel state information reference symbol used for measurement of measResultPCell is a channel state information reference symbol that is utilized for intercell cooperative communication of the serving cell and used to obtain the downlink channel state information, and in the case that the plurality of channel state information reference symbols used to obtain downlink channel state information are configured, a channel state information reference symbol of the highest received quality may be configured, a channel state information reference symbol of the lowest received quality may also be configured, an average of the received quality of all channel state information reference symbols may also be the received quality, and a channel state information reference symbol to be used may also be specified from the base station apparatus by RRC signaling. In addition, the received quality may be an average value of received power of given one or a plurality of antenna ports, may also be the best value, and may also be the lowest value. In addition, the channel state information reference symbol used to obtain downlink channel state information may be specified in the physical parameter configurations, such as PhysicalConfigDedicated, may also be specified in a newly configured parameter configuration (such as csi-RS-Config-r11), and may also be specified in the configurations for feedback of the channel state information (such as cqi-ReportConfig). It is possible that the base station apparatus 1 having received the measurement report determines whether measResultPCell is the received quality of a cell-specific reference signal or the received quality of the channel state information reference symbol from the measurement ID included in the measurement report. In addition, regardless of the measurement event, the received quality of the cell-specific reference signal of the serving cell may also be configured in measResultPCell.

The base station apparatus 1 that has received the measurement report from the mobile station apparatus 2 identifies, in step S76, whether the reported measurement report is a conventional RRM measurement report or a channel state information reference symbol management and measurement report from the measurement ID included in the measurement report. In addition, in the case that a measured value is included in the measurement report, whether a measured value of the cell-specific reference signal or a measured value of the channel state information reference symbol is determined from the measurement ID included in the measurement report. In addition, in a communication system where an identifier to identify a channel state information reference symbol configuration is reported as a physical cell identifier, in the case that a physical cell identifier is included in the measurement report, whether a physical cell identifier of the adjacent cell or an identifier of the channel state information reference symbol configuration is determined from the measurement ID included in the measurement report. In addition, the measurement report may also be notified as a message in a form different from the RRM measurement report to the base station apparatus 1.

As described above, similar to the first embodiment, it is possible to add a mechanism of channel state information reference symbol management and measurement with minor alterations to the mechanism of conventional RRM measurement without newly defining a message dedicated to channel state information reference symbol management and measurement by including a measurement event using a channel state information reference symbol in a report configuration and carrying out selection of a reference signal to be measured in the mobile station apparatus 2 based on a type of measurement event. Further, even in the case that the channel state information reference symbol is configured, it is possible to switch between measurement of a cell-specific reference signal and measurement of a channel state information reference symbol based on the measurement event.

The "received quality" used in the descriptions of the above first through third embodiments may be a reference signal received power (RSRP), may also be reference signal received quality (RSRQ), may also indicate pass loss and a measured value other than that (SIR, SINR, RSSI, BLER), and may also be combination of a plurality of these measured values.

In addition, in each of the above embodiments, even in the case that a channel state information reference symbol is configured as the reference signal used for measurement, measurement of a cell-specific reference signal may also be carried out for the reasons, such as inclusion of the measurement result of the received quality of the cell-specific reference signal of the serving cell in the measurement report, and use of the received quality of the cell-specific reference signal as a condition of starting RRM measurement and channel state information reference symbol management and measurement.

In addition, the name of each parameter represented in the embodiments of the present invention is called for the convenience of description, and a case where an actually applied parameter name is different from the parameter name of the present invention does not affect the spirit of the invention claimed by the present invention.

Descriptions have been given above to the embodiments of the present invention, and the base station apparatus and the mobile station apparatus of the present invention may also be subject to control illustrated in each embodiment by storing a program to achieve a function of each unit of the base station apparatus and the mobile station apparatus or a part of these functions in a computer-readable storage medium and loading the program stored in the storage medium in a computer system for execution. The "computer system" here includes an OS and hardware, such as peripheral devices.

In addition, the "computer-readable storage medium" indicates a portable medium, such as a flexible disk, a magneto-optical disk, a ROM, and a CD-ROM, and a memory device, such as a hard disk built in the computer system. Further, the "computer-readable storage medium" also includes one that dynamically retains a program for a short period of time, such as a communication line in the case of transmitting a program via a network like the Internet and a communication line like a telephone line and one that retains a program for a certain period of time, such as a volatile memory inside the computer system to be a server or a client in that case. In addition, the program may also be one to achieve a part of the function described before, and further, may also be one that is capable of achieving the function described before in combination with a program already stored in a computer system.

In addition, each functional block used in each of the above embodiments may also be achieved typically as an LSI, which is an integrated circuit. Each functional block may also be fabricated as a chip individually, and part or all may also be fabricated as a chip by integration. In addition, the technique for circuit integration is not limited to the LSI and may also be achieved by a dedicated circuit or a general purpose processor. In addition, in the case that a technique for circuit integration substituting the LSI appears thanks to progress in the semiconductor technique, it is also possible to use an integrated circuit by the technique.

Although detailed descriptions have been given above to the embodiments of the present invention based on the particular specific examples, it is apparent that the spirit of the present invention and the scope of patent claims are not limited to these particular specific examples. That is, the descriptions herein are for the purpose of exemplified descriptions and do not add any limitation to the present invention.

DESCRIPTION OF REFERENCE NUMERALS 1 base station apparatus
2 mobile station apparatus
101, 201 reception unit
102, 202 demodulation unit
103, 203 decoding unit
104, 205 control unit
105, 207 coding unit
106, 208 modulation unit
107, 209 transmission unit
108 network signal transmission and reception unit
109, 210 upper layer
204 measurement unit
206 random access processing unit

The invention claimed is:

1. A mobile station apparatus comprising:
reception circuitry configured to receive from a base station apparatus, a measurement configuration indicating a configuration of measurement using reference signals, wherein
the measurement configuration includes a measurement object indicating at least one object to measure and a report configuration including event information, the event information indicating at least one measurement event specified as a condition, and
the at least one measurement event being at least either one of a first measurement event using a channel state information reference signal as the reference signal and a second measurement event using a first cell-specific reference signal; and
transmission circuitry configured to transmit to the base station apparatus, a measurement report including a first measurement result of the at least one measurement event and a second measurement result of a second cell-specific reference signal from the serving cell, regardless of the at least one measurement event, the respective measurement results including a reference signal received power.

2. A communication method for a mobile station apparatus, the communication method comprising:
receiving from a base station apparatus, a measurement configuration indicating a configuration of measurement using reference signals, wherein
the measurement configuration includes a measurement object indicating at least one object to measure and a report configuration including event information, the event information indicating at least one measurement event specified as a condition, and
the at least one measurement event being at least either one of a first measurement event using a channel state information reference signal as the reference signal and a second measurement event using a first cell-specific signal; and
transmitting to the base station apparatus, a measurement report including a first measurement result of the at least one measurement event and a second measurement result of a second cell-specific signal from the serving cell, regardless of the at least one measurement event, the respective measurement results including a reference signal received power.

* * * * *